United States Patent
Warnes

(10) Patent No.: US 11,342,737 B2
(45) Date of Patent: May 24, 2022

(54) SHORT-CIRCUIT-PROTECTED LOW-DROPOUT LINEAR REGULATOR

(71) Applicant: Murata Manufacturing Co., Ltd., Nagaokakyo (JP)

(72) Inventor: Frank Warnes, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/066,857

(22) Filed: Oct. 9, 2020

(65) Prior Publication Data

US 2022/0115861 A1    Apr. 14, 2022

(51) Int. Cl.
*H02H 3/087*  (2006.01)
*H02H 7/12*  (2006.01)
*H02H 3/10*  (2006.01)

(52) U.S. Cl.
CPC ............. *H02H 3/087* (2013.01); *H02H 3/10* (2013.01); *H02H 7/1213* (2013.01)

(58) Field of Classification Search
CPC   H02H 3/08; H02H 3/087; H02H 3/10; H02H 7/1213
See application file for complete search history.

(56) References Cited

U.S. PATENT DOCUMENTS

| | | | |
|---|---|---|---|
| 5,748,422 A | 5/1998 | Heaston et al. | |
| 6,870,721 B2 | 3/2005 | Chen | |
| 7,898,234 B1 * | 3/2011 | Lash | G05F 1/607 |
| | | | 323/284 |
| 10,678,282 B1 * | 6/2020 | Pannizzo | G05F 1/573 |
| 2003/0076638 A1 * | 4/2003 | Simonelli | G05F 1/573 |
| | | | 361/56 |

FOREIGN PATENT DOCUMENTS

WO    2014/039191 A1    3/2014

* cited by examiner

*Primary Examiner* — Jared Fureman
*Assistant Examiner* — Christopher J Clark
(74) *Attorney, Agent, or Firm* — Keating & Bennett, LLP

(57) ABSTRACT

A circuit includes a first input terminal; a second input terminal; a first output terminal; a second output terminal; a first parallel circuit including a first transistor and a first capacitor; and a second parallel circuit including a first resistor, a second resistor, a diode, and a second capacitor. The first parallel circuit and the second parallel circuit are each connected in parallel between the first input terminal and the second input terminal and in parallel between the first output terminal and the second output terminal.

16 Claims, 3 Drawing Sheets

SHORT-CIRCUIT-PROTECTED LOW-DROPOUT LINEAR REGULATOR

BACKGROUND OF THE INVENTION

1. Field of the Invention

The present invention relates to power sources. More specifically, the present invention relates to a circuit that protects a DC power source when an output of the DC power source is short-circuited.

2. Description of the Related Art

FIG. 4 shows an example of a linear regulator that includes a sense resistor R4 located in series with the linear regulator to provide a detection of the current at the output voltage. As shown in FIG. 4, the sense resistor R4 is provided to detect current at the output voltage Vout, and the sense resistor R4 and a transistor Q1 are provided in series between the input voltage Vin and the output voltage Vout. The circuit shown in FIG. 4 also includes a comparator or operational amplifier A1 with a first input receiving a voltage set by a Zener diode D1, which is connected to the input voltage Vin by a resistor R1. A second input of the comparator or operational amplifier A1 is connected to a voltage divider, which is defined by resistors R2 and R3, and is connected to the output voltage Vout. A transistor Q2 provides current limiting in the circuit shown in FIG. 4.

However, the transistor Q1 shown in FIG. 4 is an NPN transistor that is provided in series between the input voltage Vin and the output voltage Vout. The transistor Q2 is used to sense the voltage drop across the sense resistor R4, which causes a maximum voltage loss due to the base-emitter voltage of the transistor Q2 (about 0.6 V).

FIG. 5 shows another example of a linear regulator that includes a sense resistor R2 located in series with the linear regulator to provide a detection of a maximum limit to the current at the output voltage. As shown in FIG. 5, the sense resistor R2 is provided to detect current at the input voltage Vin, and the sense resistor R2 and a transistor Q1 are provided in series between the input voltage Vin and the output voltage Vout. A current limit is reached when a voltage drop across the sense resistor R2 is high enough that the transistor Q1 is unable to saturate any lower, and the output voltage Vout begins to reduce. So the volt drop across R2 is an additional loss in series with the linear regulator. The transistor Q1, the resistor R1, and the Zener diode D1 define a linear regulator, which sets the output voltage Vout to the Zener voltage of the Zener diode D1 minus the base-emitter voltage of the transistor Q1 (about 0.6 V). The capacitor C1 is a filtering capacitor that is electrically connected in parallel with the output load of the circuit.

However, loss is caused in the circuit shown in FIG. 5 due to the sense resistor R2 being provided in series between the input voltage Vin and the output voltage Vout.

FIG. 6 shows an example of the short-circuit protection circuit described in WO 2014/039191 ("Method and apparatus for continuous short-circuit protection") connected to an output of a linear regulator. As shown in FIG. 6, a short-circuit protection circuit 20 is connected to the output of a linear regulator 10.

However, the circuitry shown in FIG. 6 increases the voltage drop of the linear regulator due to an additional voltage loss provided in series with the voltage drop of the transistor Q1, and requires many circuit components to implement both the linear regulator 10 and the short-circuit protection circuit 20.

FIG. 7 shows an example of a linear regulator that includes a thermal shutdown circuit. As shown in FIG. 7, the operation of the linear regulator is thermally limited by the thermal shutdown circuit connected to the base of the transistor Q1.

However, thermal limiting circuitry is generally unreliable, as it is environmentally dependent. For example, in a cold environment, thermal limiting circuitry may fail to properly stop the operation of a linear regulator during a short-circuit condition, which can lead to failure of circuitry components. Similarly, in a hot environment, thermal limiting circuitry may undesirably stop the operation of a linear regulator when a short-circuit condition has not occurred.

SUMMARY OF THE INVENTION

To overcome the problems described above, preferred embodiments of the present invention provide short-circuit-protected low-dropout linear regulators that are each low cost and low power.

A circuit according to a preferred embodiment of the present invention includes a first input terminal; a second input terminal; a first output terminal; a second output terminal; a first parallel circuit including a first transistor and a first capacitor; and a second parallel circuit including a first resistor, a second resistor, a diode, and a second capacitor. The first parallel circuit and the second parallel circuit are each connected in parallel between the first input terminal and the second input terminal and in parallel between the first output terminal and the second output terminal.

The first transistor and the first capacitor can be connected in series. The first transistor can be a bipolar junction transistor, and the first capacitor can be connected to a collector terminal of the first transistor.

The first resistor, the second resistor, and the diode can be connected in series, and the second capacitor can be connected in parallel with the diode. A control terminal of the first transistor can be connected to a node between the first resistor and the second resistor.

The diode can be a Zener diode. A third capacitor can be connected in parallel between the first output terminal and the second output terminal or in parallel between the first input terminal and the second input terminal.

The circuit can further include a second transistor connected in series between the second input terminal and the second output terminal and can further include a third transistor connected between the first input terminal and a control terminal of the second transistor. The second transistor can be an n-channel metal oxide semiconductor field effect transistor (MOSFET). The circuit can further include a third resistor connected in parallel with the third transistor. A control terminal of the third transistor can be connected to a node between the first transistor and the first capacitor. The circuit can further include a fifth resistor connected in parallel with the first capacitor.

The circuit can further include a second transistor connected in series between the first input terminal and the first output terminal and a third transistor connected between the second input terminal and a control terminal of the second transistor. The third transistor can be a p-channel MOSFET. The circuit can further include a fourth resistor connected between the control terminal of the second transistor and the second input terminal.

A circuit according to a preferred embodiment of the present invention includes a first input terminal; a second input terminal; a first output terminal; a second output terminal; a first parallel circuit including a first transistor and a first capacitor; a second parallel circuit including a first resistor, a diode, and a second capacitor; and a third parallel circuit including a second resistor and a third resistor. The first parallel circuit, the second parallel circuit, and the third parallel circuit are each connected in parallel between the first input terminal and the second input terminal and in parallel between the first output terminal and the second output terminal.

The diode can be a shunt regulator diode. The second resistor and the third resistor can be connected in series, and a node between the second resistor and the third resistor can provide a reference voltage for the shunt regulator diode. The diode and the second capacitor can be connected in parallel, and the first resistor can be connected in series with the diode. A control terminal of the first transistor can be connected to a node between the first resistor and the diode.

A converter according to a preferred embodiment of the present invention includes first and second input terminals, first and second output terminals, a first transistor connected between the second input terminal and the second output terminal, a short-circuit protection circuit that is connected to a control terminal of the first transistor and that is connected between the first and the second output terminals, and a regulation circuit that is connected to the short-circuit protection circuit and that is connected between the first and the second output terminals. During short-circuit conditions, the short-circuit protection circuit controls the first transistor to stop current flow. During non-short-circuit conditions and when an input voltage applied across the first and the second input terminals is above a predetermined voltage, the regulation circuit causes the short-circuit protection circuit to operate the first transistor in a linear mode to provide a regulated output voltage across the first and the second output terminals.

The short-circuit protection circuit can include a second transistor connected between the first output terminal and the control terminal of the first transistor and a resistor connected between a control terminal of the second transistor and the second output terminal. The regulation circuit can include a third transistor connected between the first output terminal and the control terminal of the second transistor and a voltage-setting circuit that is connected to a control terminal of the third transistor and that determines the predetermined voltage. The voltage-setting circuit can include a Zener diode or a shunt regulator diode.

The converter can further include a startup circuit that disables the short-circuit protection circuit during startup. The startup circuit can include a resistor connected in parallel with the first transistor.

The converter can include a discharge circuit that discharges a capacitive charge at the control terminal of the first transistor. The first transistor can be an n-channel MOSFET or a p-channel MOSFET. The first input terminal and the first output terminal can be connected to provide a common ground.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Figure 1:
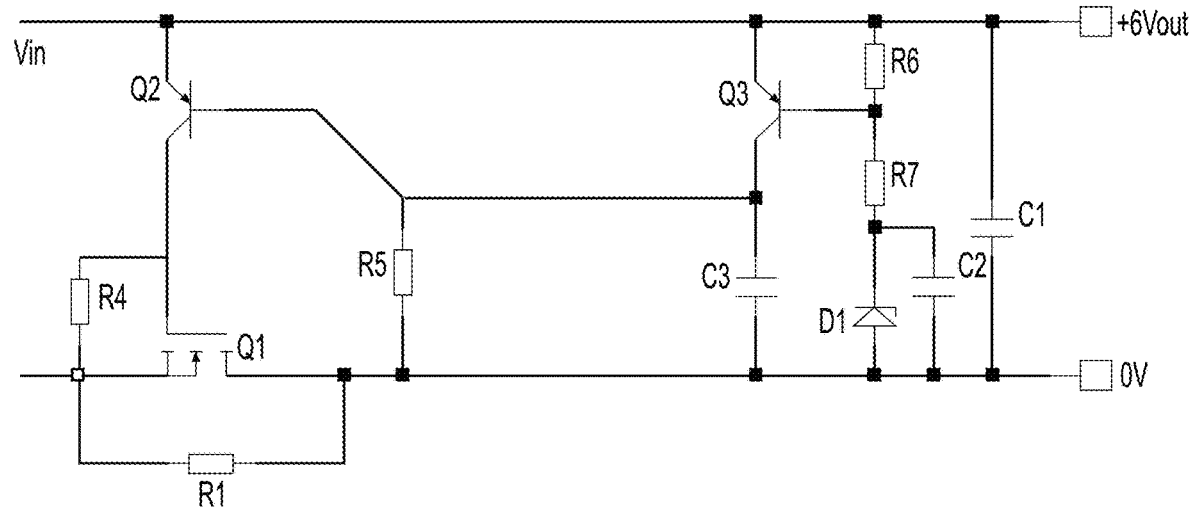
FIG. 1 shows a circuit diagram of a converter according to a first preferred embodiment of the present invention.
Figure 2:
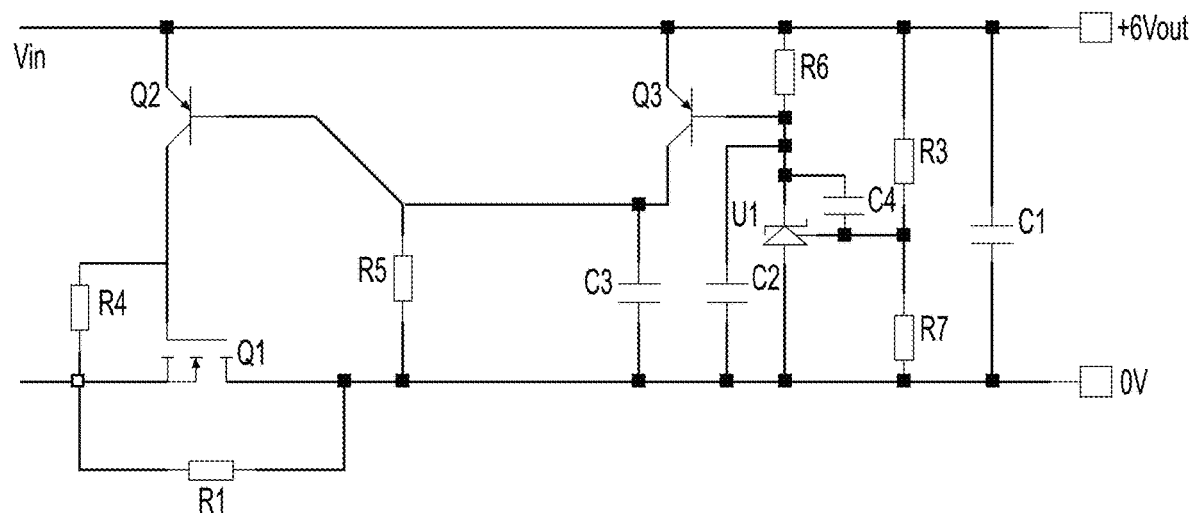
FIG. 2 shows a circuit diagram of a converter according to a second preferred embodiment of the present invention.
Figure 3:
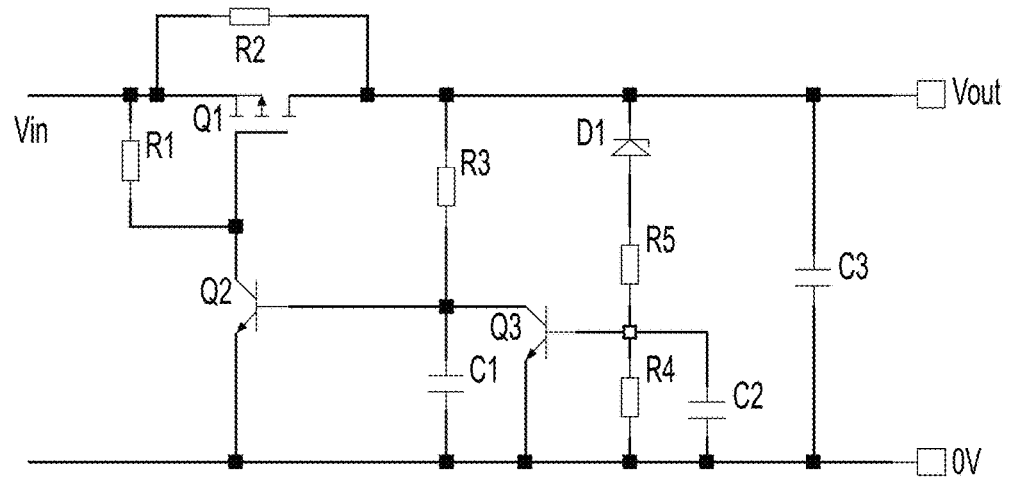
FIG. 3 shows a modification of the converter shown FIG. 1.

First and second preferred embodiments of the present invention, and modifications of the first and second preferred embodiments, will now be described with reference to FIGS. 1 to 3. In converters according to the preferred embodiments of the present invention and modifications thereof, a protected output can be provided by turning off a first switch that connects a voltage rail of a power source to a protected voltage rail, and a regulated output can be provided by operating the first switch in a linear region. As shown in FIGS. 1-3, the first switch can be a transistor Q1 connected between an input terminal and an output terminal of the converter. In FIGS. 1 and 2, the first switch is connected between the low-voltage input and output terminals, and in FIG. 3, the switch is connected between the high-voltage input and output terminals. The converters can include a short-circuit protection circuit connected to the first switch and a regulator circuit connected to the short-circuit protection circuit.

During short-circuit conditions, i.e., when the voltage on one of the output terminals drops towards the voltage of the other output terminal, the short-circuit protection circuit operates the first switch to stop current flow. When the short-circuit condition is no longer present, the short-circuit protection circuit can automatically operate the first switch to allow current to flow, without latching to an off state of the first switch. That is, the converter does not have to be reset or modified to allow current to start flowing after a short circuit. During non-short-circuit conditions and when the input voltage is above a predetermined voltage, the regulation circuit operates the first switch in a linear region to provide a regulated output at the output terminals.

The short-circuit protection circuit can be connected between the output terminals and can include a second switch and a first resistor. Instead of the second switch and the first resistor, any suitable short-circuit protection circuit can be used to operate the first switch to stop and to allow current flow. In FIGS. 1 and 2, the second switch can be a transistor Q2 including an emitter connected to the output terminal +6Vout, a collector connected to a control terminal of the first switch, and a base connected to the output terminal 0V through the first resistor (i.e., resistor R5 in FIGS. 1 and 2). In FIG. 3, the second switch can be a transistor Q2 including an emitter connected to the output terminal 0V, a collector connected to a control terminal of the first switch, and a base connected to the output terminal +6Vout through the first resistor (i.e., resistor R3 in FIG. 3).

The regulation circuit can be connected between the output terminals and can include a third switch and a voltage-setting circuit connected to the third switch. Instead of the third switch and the voltage-setting circuit, any suitable regulation circuit can be used to operate the first switch in a linear region. In FIGS. 1 and 2, the third switch can be transistor Q3 that is connected between the output terminal +6Vout and the short-circuit protection circuit. In FIG. 3, the third switch can be transistor Q3 that is connected between the output terminal 0V and the short-circuit protection circuit. As shown in FIGS. 1-3, the voltage-setting circuit can be connected to the base of transistor Q2. The voltage-setting circuit determines the predetermined voltage above which the first switch is operated in linear mode. The voltage-setting circuit can include a Zener diode D1 as shown in FIGS. 1 and 2 or can include a shunt regulator diode U1 as shown in FIG. 3, but any suitable voltage-setting circuit can be used. Although the voltage-setting circuit in FIG. 2 with the shunt regulator diode U1 might cost more than the voltage-setting circuit in FIG. 1 with the Zener diode D1, the voltage-setting circuit in FIG. 2 can have better output voltage accuracy and can vary less with temperature.

The converters can also include a startup circuit that disables the short-circuit protection circuit during start up. The startup circuit can be a second resistor (i.e., resistor R1 in FIGS. 1 and 2 and resistor R2 in FIG. 3) connected in parallel with the first switch, but other suitable startup circuits can also be used to disable the short-circuit protection circuit during startup.

The converters can also include a discharge circuit connected between the control terminal of the first switch and one of the input terminals. The discharge circuit can be resistor R4 as shown in FIGS. 1 and 2 or can be resistor R1 as shown in FIG. 3, but any suitable discharge circuit can be used.

FIG. 1 shows a circuit diagram a converter according to a first preferred embodiment of the present invention.

The converter in FIG. 1 includes short-circuit protection and a regulated output. The converter shown in FIG. 1 provide full shutdown under short-circuit conditions when the resistor R5 is short circuited with respect to the emitter of the transistor Q2. During a short-circuit condition, the base-emitter voltage of transistor Q2 approaches zero, and when the base-emitter voltage is less than the threshold voltage, e.g., about 0.6 V, the transistor Q2 turns off. In addition, in non-short-circuit conditions, the transistor Q2 can operate in the linear mode and can function as and define a linear regulator.

The operation of the converter is as follows. Transistor Q1 can be operated in the linear region as a linear regulator and can be operated to stop current flow to provide short-circuit protection. When operating as a linear regulator, the transistor Q2 passes current to the gate of transistor Q1 to turn on transistor Q1. If transistor Q2 is fully on, then the transistor Q1 is fully saturated, and thus the transistor Q1 passes a full voltage range to the output of the linear regulator. When a short-circuit condition occurs and transistor Q2 turns off, the resistor R4 dissipates a capacitive charge at the gate of the transistor Q1, and transistor Q1 turns off.

In some applications, the linear regulator may provide an output voltage Vout of about 6 V±0.25 V, for example. An input voltage Vin can be higher than the output voltage Vout of the linear regulator to increase the accuracy of the output voltage Vout. For example, the input voltage Vin may be about 7 V to about 8 V.

When the input voltage Vin is connected to the converter shown in FIG. 1, the resistor R1 and the output load across the output terminals Vout and 0V define a voltage divider, and a voltage greater than about 0.6 V is provided across the base and the emitter of the transistor Q2 through the resistor R5. Accordingly, the transistor Q2 turns on and a voltage equal or substantially equal to the input voltage Vin is applied across the resistor R4 and across the gate and the source of the transistor Q1. The transistor Q1 turns on and bypasses the resistor R1, and substantially the entire input voltage Vin (minus the very low saturation voltage of the transistor Q1, for example, less than about 0.1 V) is applied to the output voltage Vout.

A regulation circuit is shown in FIG. 1 and includes the transistor Q3, the resistor R6, the resistor R7, the diode D1, the capacitor C3, and the capacitor C2. The regulation circuit operates when the input voltage Vin is higher than a predetermined output voltage. The predetermined output voltage is determined by the values of the diode D1, the resistor R6, and the resistor R7. As shown in FIG. 1, the transistor Q3 can be a bipolar junction transistor (BJT), for example.

As a specific example, the diode D1 is a Zener diode with a Zener voltage of about 5.1 V, the resistor R6 has a resistance of about 430Ω, and the resistor R7 has a resistance of about 560Ω. With these values of the diode D1, the resistor R6, and the resistor R7, the predetermined output voltage is determined by the following equation (1):

$$Vout = VD1 + Q3\,Vbe(1+R6/R7) = 5.1\ V + 0.6\ V(1+430\Omega/560\Omega) = 6.16\ V \tag{1}$$

When the diode D1 shown in FIG. 1 starts to conduct, current passes through the resistor R6 and the resistor R7. When the voltage across the resistor R6 reaches about 0.6 V, this voltage is applied across the base and the emitter of the transistor Q3, and the transistor Q3 starts to turn on. The transistor Q3 is connected directly across the base and the emitter of the transistor Q2. Accordingly, the transistor Q2 turns off when the transistor Q3 turns on, which reduces voltage across the gate and the source of the transistor Q1 and causes the transistor Q1 to start to turn off. The process described above defines a closed loop system. The transistor Q1 starts to operate in a linear mode, an equilibrium is reached, and the output voltage Vout is maintained at about the predetermined output voltage (for example, about 6.16 V) at any input voltage Vin above the predetermined output voltage. During a short-circuit condition, when the output voltage Vout is reduced to less than about 0.6 V, the transistor Q2 turns off completely because there is insufficient voltage across the base and the emitter of the transistor Q2, via the resistor R5, for the transistor Q2 to maintain a conduction state. Accordingly, the converter remains in a low-power safe state during the short-circuit condition.

The linear regulator shown in FIG. 1 is a low-dropout regulator because the lowest voltage drop between the input voltage Vin and output voltage Vout is defined by Iout× Q1Rdson, which can be extremely low, for example, less than about 0.1 V due to the saturation voltage of the transistor Q1. The transistor Q1 can be an n-channel metal oxide semiconductor field effect transistor (MOSFET), which provides a lower Rdson value than a p-channel MOSFET. However, if an n-channel MOSFET is included as the transistor Q1, the input voltage Vin is typically provided by an isolated transformer-derived voltage, for example, a DC-DC converter. A common ground application circuit would require the circuitry shown in FIG. 3, which is explained below. The capacitors C2 and C3 are included to increase closed-loop stability of the linear regulator.

The capacitor C1 is a filtering capacitor that is electrically connected in parallel with the output load across the output terminals Vout and 0V. The capacitor C1 smooths the voltage that is provided to the output load, and may be moved, omitted, or replaced by other circuitry to smooth and/or regulate the voltage that is provided to the output load. As an example, the capacitor C1 could alternatively or additionally be placed at the input of the converter shown in FIG. 1 to smooth and/or regulate the input voltage Vin.

As shown in FIG. 1, the converter according to the first preferred embodiment does not include an additional series shutdown switch. An additional series shutdown switch provides a voltage drop and power loss to the output load, and thus converters of the first preferred embodiment are able to provide a short-circuit protection circuit and a linear regulator with increased efficiency by not including an additional series shutdown switch. In addition, including an additional series shutdown switch increases the cost and size of the converter, and thus the first preferred embodiment is able to provide a short-circuit protection circuit and a linear regulator that is inexpensive to manufacture, and which has a reduced circuitry footprint.

Figure 4:
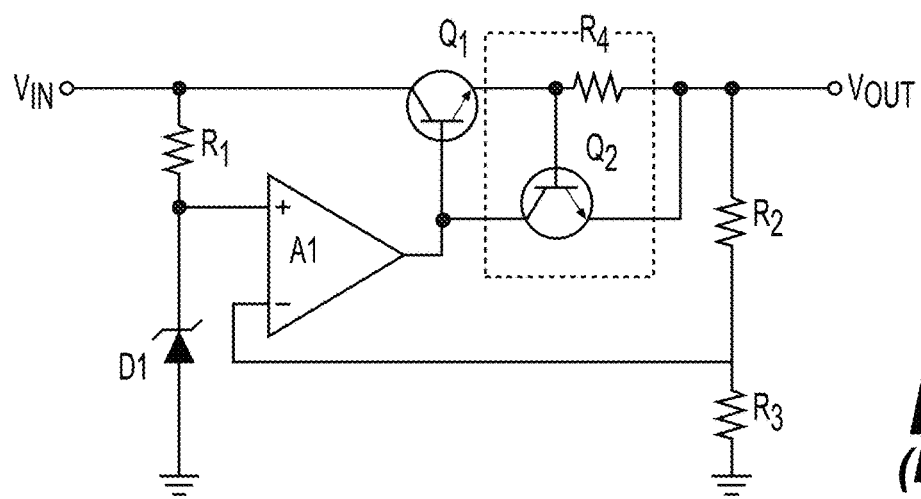
FIG. 4 shows an example of a known linear regulator that includes a sense resistor located in series with the linear regulator to provide a detection of the current at the output voltage.
Figure 5:
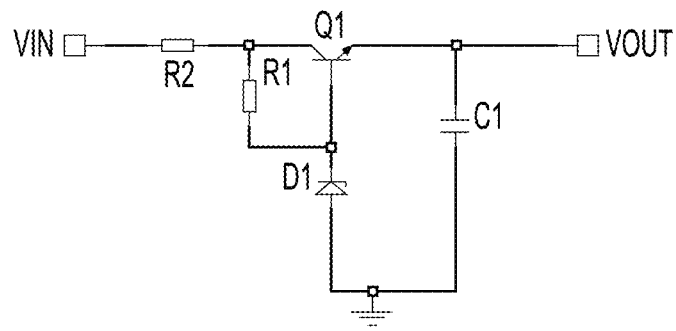
FIG. 5 shows another example of a known linear regulator that includes a sense resistor located in series with the linear regulator to provide a detection of a maximum limit to the current at the output voltage.
Figure 6:
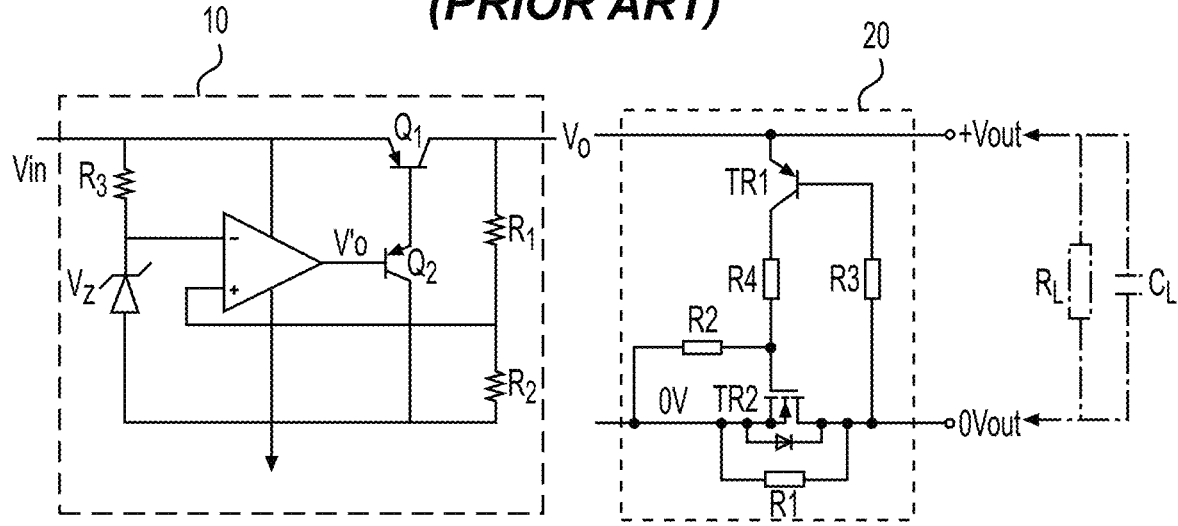
FIG. 6 shows an example of a known short-circuit protection circuit connected to an output of a linear regulator.

The converter according to the first preferred embodiment does not include a series current sense resistor (for example, resistor R4 shown in FIG. 4 and resistor R2 shown in FIG. 5). Similar to a series shutdown switch, a series current sense resistor provides a voltage drop and power loss to the output load, and thus the first preferred embodiment is able to provide a converter with increased efficiency by not including a series current sense resistor. In addition, including a series current sense resistor increases the cost and size of the converter, and thus the first preferred embodiment is able to provide a converter that is inexpensive to manufacture and that has a reduced footprint.

Figure 7:
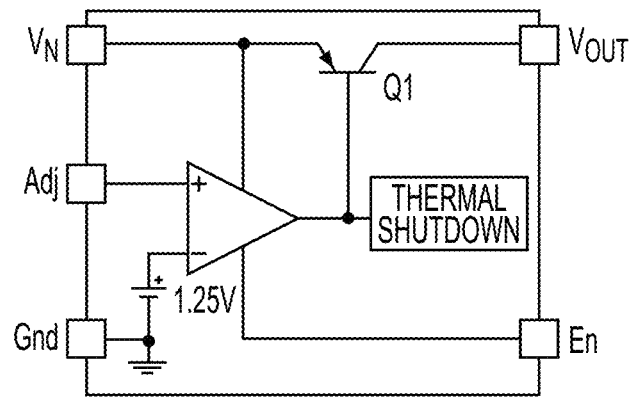
FIG. 7 shows an example of a known linear regulator that includes a thermal shutdown circuit.

The converter according to the first preferred embodiment does not include any thermal limiting circuitry, for example, the thermal shutdown circuitry shown in FIG. 7. In general, thermal limiting circuitry is unreliable, as it is environmentally dependent. For example, in a cold environment, thermal limiting circuitry may fail to properly stop the operation of the converter during a short-circuit condition, which can lead to failure of circuitry components. Similarly, in a hot environment, thermal limiting circuitry may undesirably stop the operation of the converter when a short-circuit condition has not occurred.

The converter according to the first preferred embodiment does not latch to an off state when a short-circuit condition occurs, thereby enabling the linear regulator to automatically resume normal operation when the short-circuit condition is removed. In contrast, known short-circuit protection circuits for linear regulators can latch to an off state when a short-circuit condition occurs, thereby causing the linear regulator to turn off until an external command is provided to restart the operation of the linear regulator.

FIG. 2 shows a circuit diagram of a converter according to a second preferred embodiment of the present invention.

As shown in FIG. 2, a shunt regulator diode U1 may be included in the short-circuit protection circuit in place of the Zener diode D1 shown in FIG. 1. The shunt regulator diode U1 may be, for example, a TL431 shunt regulator. Resistors R3 and R7 define a voltage divider that provides a reference voltage for the shunt regulator diode U1. For example, the shunt regulator diode U1 may have an internal reference voltage of about 2.5 V, which sets the output voltage Vout to 2.5 V×(1+R3/R7). Capacitor C4 provides negative feedback from the cathode of the shunt regulator diode U1 to the reference input the shunt regulator diode U1 to increase closed-loop stability of the linear regulator.

By including the shunt regulator diode U1, the converter shown in FIG. 2 is able to provide a very accurate output voltage, for example, about ±1% of a predetermined output voltage. Other features, components, and elements of the converter shown in FIG. 2 are the same as, or similar to, the features, components, and elements of the converter shown in FIG. 1. In particular, both the converters shown in FIGS. 1 and 2 maintain a substantially fixed output voltage Vout by controlling the current that flows through the resistor R6.

FIG. 3 shows a modification of the converter shown FIG. 1.

As shown in FIG. 3, the transistor Q1 of the converter shown in FIG. 1 may be modified to be a p-channel MOSFET. The modification shown in FIG. 3 provides a common ground between the input voltage Vin and the output voltage Vout. By including a common ground between the input voltage Vin and the output voltage Vout as shown in FIG. 3, the input voltage is able to be provided by a non-isolated converter. In contrast, as described above with respect to FIG. 1, the input voltage Vin for the converter shown in FIG. 1 can be provided by an isolated transformer. However, the Rdson of a p-channel MOSFET is higher than the Rdson of a similarly-sized n-channel MOSFET. Accordingly, including a p-channel MOSFET instead of a n-channel MOSFET increases a voltage drop between the input voltage Vin and the output voltage Vout.

The converter according to the second preferred embodiment, as shown in FIG. 2, can similarly be modified to replace the n-channel MOSFET Q1 with a p-channel MOSFET.

As an alternative modification to the converters shown in FIGS. 1-3, the transistor Q1 can also be replaced by a bipolar transistor, a silicon carbide (SiC) transistor, or a gallium nitride (GaN) transistor. In addition, the regulation circuits of the converters shown in FIGS. 1-3 can be modified to include an operational amplifier or a comparator that regulates the output voltage Vout with reference to a control voltage or a signal from another regulation circuit.

The preferred embodiments and modifications described above are shown as providing output voltage terminals of +6 V and 0 V. However, the preferred embodiments and modifications are not limited to these specific voltages, and other output voltages may be provided, for example, output voltage terminals of +12 V and 0 V, output voltage terminals of +3 V and −3 V, output voltage terminals of +0 V and −6 V, and the like.

The preferred embodiments and modifications described above can be used in any type of linear regulator application to provide one or more of the above-described advantages of low cost, low component count, and low voltage drop. The preferred embodiments and modifications described above can be implemented in a wide variety of application fields, including commercial, industrial, and automotive.

The preferred embodiments and modifications described above provide short-circuit protection for linear regulators, to prevent damage to circuit components due to a short-circuit condition. In particular, the preferred embodiments and modifications described above are able to significantly reduce or prevent damage to the transistor Q1 (a series pass element) during a short-circuit condition. In addition, preferred embodiments and modifications described above provide short-circuit protection without using any additional series shutdown switch, without using any series current sense resistors, and without using any thermal limiting components, which can be unreliable. The preferred embodiments and modifications described above also provide short-circuit protection that operates continuously, while also providing a low manufacturing cost with few circuit components.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A circuit comprising:
a first input terminal, a second input terminal, a first output terminal, and a second output terminal;
a first parallel circuit including a first transistor and a first capacitor that are connected in series;
a second parallel circuit including a first resistor, a second resistor, a diode, and a second capacitor;
a second transistor connected in series between the second input terminal and the second output terminal; and
a third transistor connected between the first input terminal and a control terminal of the second transistor;
wherein the first parallel circuit and the second parallel circuit are each connected in parallel between the first input terminal and the second input terminal and in parallel between the first output terminal and the second output terminal.

2. The circuit according to claim 1, wherein:
the first resistor, the second resistor, and the diode are connected in series,
the second capacitor is connected in parallel with the diode, and
a control terminal of the first transistor is connected to a node between the first resistor and the second resistor.

3. The circuit according to claim 1, wherein the second transistor is an n-channel metal oxide semiconductor field effect transistor (MOSFET).

4. The circuit according to claim 1, further comprising:
a third resistor connected in parallel with the second transistor; and
a fourth resistor connected between the control terminal of the second transistor and the second input terminal.

5. The circuit according to claim 1, wherein a control terminal of the third transistor is connected to a node between the first transistor and the first capacitor.

6. A circuit comprising:
a first input terminal, a second input terminal, a first output terminal, and a second output terminal;
a first parallel circuit including a first transistor and a first capacitor;
a second parallel circuit including a first resistor, a shunt regulator diode, and a second capacitor; and
a third parallel circuit including a second resistor and a third resistor that are connected in series, wherein
the first parallel circuit, the second parallel circuit, and the third parallel circuit are each connected in parallel between the first input terminal and the second input terminal and in parallel between the first output terminal and the second output terminal, and
a node between the second resistor and the third resistor provides a reference voltage for the shunt regulator diode.

7. The circuit according to claim 6, wherein:
the shunt regulator diode and the second capacitor are connected in parallel, and the first resistor is connected in series with the shunt regulator diode.

8. The circuit according to claim 6, wherein a control terminal of the first transistor is connected to a node between the first resistor and the shunt regulator diode.

9. A converter comprising:
first and second input terminals;
first and second output terminals;
a first transistor connected between the second input terminal and the second output terminal;
a short-circuit protection circuit that is connected to a control terminal of the first transistor and that is connected between the first and the second output terminals; and
a regulation circuit that is connected to the short-circuit protection circuit and that is connected between the first and the second output terminals; wherein
during short-circuit conditions, the short-circuit protection circuit controls the first transistor to stop current flow; and
during non-short-circuit conditions and when an input voltage applied across the first and the second input terminals is above a predetermined voltage, the regulation circuit causes the short-circuit protection circuit to operate the first transistor in a linear mode to provide a regulated output voltage across the first and the second output terminals.

10. The converter of claim 9, wherein the short-circuit protection circuit includes:
a second transistor connected between the first output terminal and the control terminal of the first transistor; and
a resistor connected between a control terminal of the second transistor and the second output terminal.

11. The converter of claim 10, wherein the regulation circuit includes:
a third transistor connected between the first output terminal and the control terminal of the second transistor;
a voltage-setting circuit that is connected to a control terminal of the third transistor and that determines the predetermined voltage; and
the voltage-setting circuit includes a Zener diode or a shunt regulator diode.

12. The converter of claim 10, further comprising a startup circuit that disables the short-circuit protection circuit during startup.

13. The converter of claim 10, further comprising a discharge circuit that discharges a capacitive charge at the control terminal of the first transistor.

14. The converter of claim 10, wherein the first transistor is an n-channel MOSFET.

15. The converter of claim 10, wherein the first input terminal and the first output terminal are connected to provide a common ground.

16. The converter of claim 10, wherein the first transistor is a p-channel MOSFET.

* * * * *